(12) United States Patent
Barton et al.

(10) Patent No.: US 11,346,323 B2
(45) Date of Patent: May 31, 2022

(54) ENERGY COLLECTOR

(71) Applicant: Barton Blakeley Technologies Limited, Hertfordshire (GB)

(72) Inventors: Christopher Barton, Hertfordshire (GB); Timothy Smeda, Devon (GB)

(73) Assignee: BARTON BLAKELEY TECHNOLOGIES LIMITED, Hertfordshire (GB)

(*) Notice: Subject to any disclaimer, the term of this patent is extended or adjusted under 35 U.S.C. 154(b) by 0 days.

(21) Appl. No.: 16/768,778

(22) PCT Filed: Nov. 29, 2018

(86) PCT No.: PCT/GB2018/053458
§ 371 (c)(1),
(2) Date: Jun. 1, 2020

(87) PCT Pub. No.: WO2019/106371
PCT Pub. Date: Jun. 6, 2019

(65) Prior Publication Data
US 2020/0318616 A1 Oct. 8, 2020

(30) Foreign Application Priority Data
Dec. 1, 2017 (GB) .................................. 1720079

(51) Int. Cl.
F03D 9/25 (2016.01)
F03D 3/04 (2006.01)
H02N 1/00 (2006.01)
F03D 1/00 (2006.01)
F03D 1/04 (2006.01)

(52) U.S. Cl.
CPC ................. F03D 9/25 (2016.05); F03D 1/00 (2013.01); F03D 1/04 (2013.01); F03D 3/04 (2013.01); H02N 1/002 (2013.01)

(58) Field of Classification Search
CPC ..... F03D 1/00; F03D 1/04; F03D 3/04; F03D 9/25; H02N 1/002
See application file for complete search history.

(56) References Cited

U.S. PATENT DOCUMENTS

2008/0061559 A1    3/2008  Hirshberg
2013/0336775 A1* 12/2013  Blake ....................... F03D 9/28
                                                                415/207
(Continued)

FOREIGN PATENT DOCUMENTS

CN          104110307        10/2014
DE   202012009612 U1 *  7/2013  ........... F03D 1/0608
(Continued)

OTHER PUBLICATIONS

Papakostas, Ioannis; Search Report under Section 17; dated Apr. 30, 2018; 1 page.
(Continued)

Primary Examiner — Audrey B. Walter
(74) Attorney, Agent, or Firm — Stetina Brunda Garred & Brucker

(57) ABSTRACT

The invention provides an energy collector which includes an electrostatic drive to increase the acceleration of a rotor to maximize the proportion of the time at which the collector is able to efficiently generate power.

19 Claims, 10 Drawing Sheets

(56) References Cited

U.S. PATENT DOCUMENTS

2015/0152849 A1* 6/2015 Allaei .................. F03D 1/02
                                                     290/55
2015/0300196 A1   10/2015 Burkett
2017/0191466 A1    7/2017 Perez
2018/0248496 A1*  8/2018 Perez .................. F03D 1/04

FOREIGN PATENT DOCUMENTS

| EP | 3239491      | 11/2017 |
| WO | WO9528761    | 10/1995 |
| WO | WO2010062788 | 6/2010  |
| WO | WO2012116532 | 9/2012  |

OTHER PUBLICATIONS

Tack, Gael; PCT International Search Report; dated Feb. 7, 2019; 11 pages, HV Rijswijk.

* cited by examiner

ENERGY COLLECTOR

CROSS-REFERENCE TO RELATED APPLICATIONS

The present application claims priority to PCT International Patent Application No. PCT/GB2018/053458, filed Nov. 29, 2018 and Great Britain Patent Application No. 1720079.1 filed on Dec. 1, 2017, the disclosure of which are incorporated herein by reference.

STATEMENT RE: FEDERALLY SPONSORED RESEARCH/DEVELOPMENT

Not Applicable

BACKGROUND

The present invention relates to energy collection and conversion devices and in particular devices for collecting energy from air movement or movement of other fluids.

BRIEF SUMMARY

Devices for collecting energy from the wind are well known and have been used in many forms for converting the collected energy into different forms of energy. Historically, the energy was used directly as mechanical energy to drive pumps and mills etc. However, it is generally preferable to convert the collected energy into electrical energy in order to provide a convenient way of utilizing the collected energy often in a remote location.

Historically, wind energy collectors have been structures having large sails or blades to efficiently capture large quantities of energy to provide a commercially viable system. However, there is ever greater interest in micro-generation projects where smaller devices are installed often in domestic locations where large turbines are not desirable or practical.

Smaller devices may be more convenient for domestic type applications but these devices have tended to be less efficient at extracting energy from the available wind energy. They can also be more sensitive to fluctuations in wind speed where they may completely stop generating power during lulls in the wind if the wind speed is highly variable which is often the case. Larger turbines all less susceptible to this as the momentum of the larger turbine structure tends to smooth out variances in wind speed, allowing power generation to be much smoother and with a much more consistent speed of rotation.

Wind turbines tend to generate most efficiently at a particular optimum speed or range of speeds and so it is preferable that the turbine rotates as close to those optimum speeds as possible. With the variability of wind speeds mentioned above, smaller generators may spend a significant proportion of their time spinning at speeds which are not close to that optimum speed. This can result in poorer energy collection efficiency, particularly compared to larger installations.

In order to address this problem it is desirable to operate a turbine at a speed as close to the optimum for as much of the time as possible.

Therefore according to the present invention there is provided an energy collector for collecting energy from a flow of fluid, the collector having: one or more inlets for receiving a flow of fluid; a rotor mounted for rotation; a turbine mounted on said rotor for receiving fluid flow from at least one of said inlets, to drive said rotor into rotation; and an electrostatic motor arranged to accelerate the rotor.

With this arrangement, additional torque can be provided to the rotor to accelerate it more rapidly than relying only on the flow of fluid through the collector. In this way, the rotor can be accelerated more rapidly to a speed at which it can more efficiently generate power from a generator or other power take off attached to the rotor. This allows the collector to operate more efficiently over a greater range of input fluid flow. For example, where the fluid is air generated by wind, the collector can operate over a greater range of wind speeds and provide useful output more quickly than without the electrostatic motor.

Preferably, the electrostatic motor includes a stationary part provided on a stationary part of the collector, a rotor part provided on said rotor, a plurality of conductive electrodes provided on one of the rotor part and the stationary part and one or more insulator portions provided on the other of the rotor part and the stationary part, wherein the rotor part and the stationary part spaced apart from each other such that the electrodes are swept by the one or more insulator portions as the rotor rotates.

The arrangement of the electrodes in proximity to the insulator portions allows an electric potential to be applied to generate a corona effect discharging ionized air from the electrodes which passes over the surface of the insulator causing the surface to become charged. This charge will then be repelled away from the charged electrode generating a force between the stationary part and the rotor part which is imparted to the rotor.

The plurality of electrodes may include one or more positive electrodes and one or more negative electrodes, wherein the electrodes are arranged to be connected to a voltage source, in use, such that the voltage applied to the positive electrodes is positive relative to the voltage applied to the negative electrodes.

This differential voltage helps to attract the electrodes to insulator which is oppositely charged and for the insulator to then be charged with the charge of the electrode as the electrode approaches and passes the insulator. The voltage on the electrodes is preferably alternated between consecutive electrodes.

In one embodiment, the rotor part may be provided on an annular outer circumferential edge of the rotor and the stationary part is formed on an annular inner surface of the collector facing the annular outer circumferential edge of the compressor.

This allows the electrodes and the insulator to be positioned on opposing faces on the outer circumferential edge on the outside of the rotor and the inner circumferential edge of the stator. The insulator may then be formed as a single ring on the rotor or stator.

The one or more insulator portions are preferably provided on the rotor and the plurality of electrodes preferably provided on the stationary part of the collector. This is convenient as the connections to the electrodes are more easily provided on the stationary part of the collector instead of having to provide the electrical source to the electrodes to the moving rotor.

The one or more insulator portions is preferably a continuous annulus of insulator material. This allows the insulator portion to be structurally simple and means that the drive can be proved to the entire circumference by the electrodes.

Each electrode preferably tapers towards a tip portion of the electrode arranged nearest the insulator portions and each tip points at least partially in a direction offset from the radial direction. The offset tip helps to direct the ionized air emitted fir the corona discharge towards the surface of the insulator in a direction corresponding to the direction of rotation. The tapered tip helps to generate the corona discharge which is more effective form pointed or sharp objects. As such having a sharp point or edge (such as along the edge of a fan blade) leading to a tip, helps to provide strong corona discharge.

The rotor motor part may be provided on the turbine. The rotor motor part may alternatively be provided on a compressor fan mounted on said rotor. The location may be selected according the overall design of the collector and other parameters may dictate or influence the locating of the rotor motor part.

The one or more insulator portions are optionally each provided with a conductive layer on the opposite side of the insulator portion to that facing the electrodes. This provides a discharge route behind the insulator layer.

The energy collector may further comprise one or more additional electrostatic motors, each arranged to accelerate the rotor. By providing electrostatic motors on multiple sets of stator/rotor pairs, additional torque can be generated to enhance the acceleration effect provided by the invention. These pairs may be provided between pairs stages made up of a stator fan and compressor fan or a stator fan and a turbine fan, particularly in collectors with multiple fan sets. Furthermore, a given rotor or stator set of blades may have their leading edges forming one half of an electrostatic motor whilst their trailing edges form part of a different electrostatic motor.

In a further embodiment, the collector preferably has a rotor motor portion arranged on the rotor, the rotor motor portion having at least one end having a generally cylindrical outer profile with an axially facing end face; a stator motor portion arranged on the stationary part of the collector, the stator motor portion having at least one end having a generally cylindrical outer profile with an axially facing end face opposing the end face on the rotor motor portion, wherein the rotor part is provided on at least a portion of said rotor motor end face, and the stationary part is provided on at least a portion of said stator motor portion end face.

This arrangement allows the large areas on the end faces to be presented to each other so that electrodes can sweep past large areas of corresponding insulator. It also allows the blades of a compressor or turbine blade set as well as a start blade set to be used to provide the electrodes and insulator portions.

The rotor motor portion may include a plurality of radially extending angularly spaced elements, the edges of the elements defining said rotor motor end face. The stationary part may include a plurality of radially extending angularly spaced elements with spaces between the elements to permit air flow through said stationary part.

The plurality of angularly spaced elements may be formed on the edges of respective fan blades. They may also be simpler spider structures used to support the insulators or electrodes. They may also have other structure such as spirals or partial spirals and so on.

The electrodes are preferably provided on the stationary part and the insulator portions are provided on the rotor part. This arrangement means that the electrodes which generally require an electrical connection can be arranged on the stationary part making such connections easier. However, this is not essential and electrical connections can be provided to the rotor parts for example using brush rings, inductive or capacitive connections and so on.

BRIEF DESCRIPTION OF THE DRAWINGS

The present invention will now be described in more detail with reference to the attached drawings in which.

DETAILED DESCRIPTION

Figure 1:
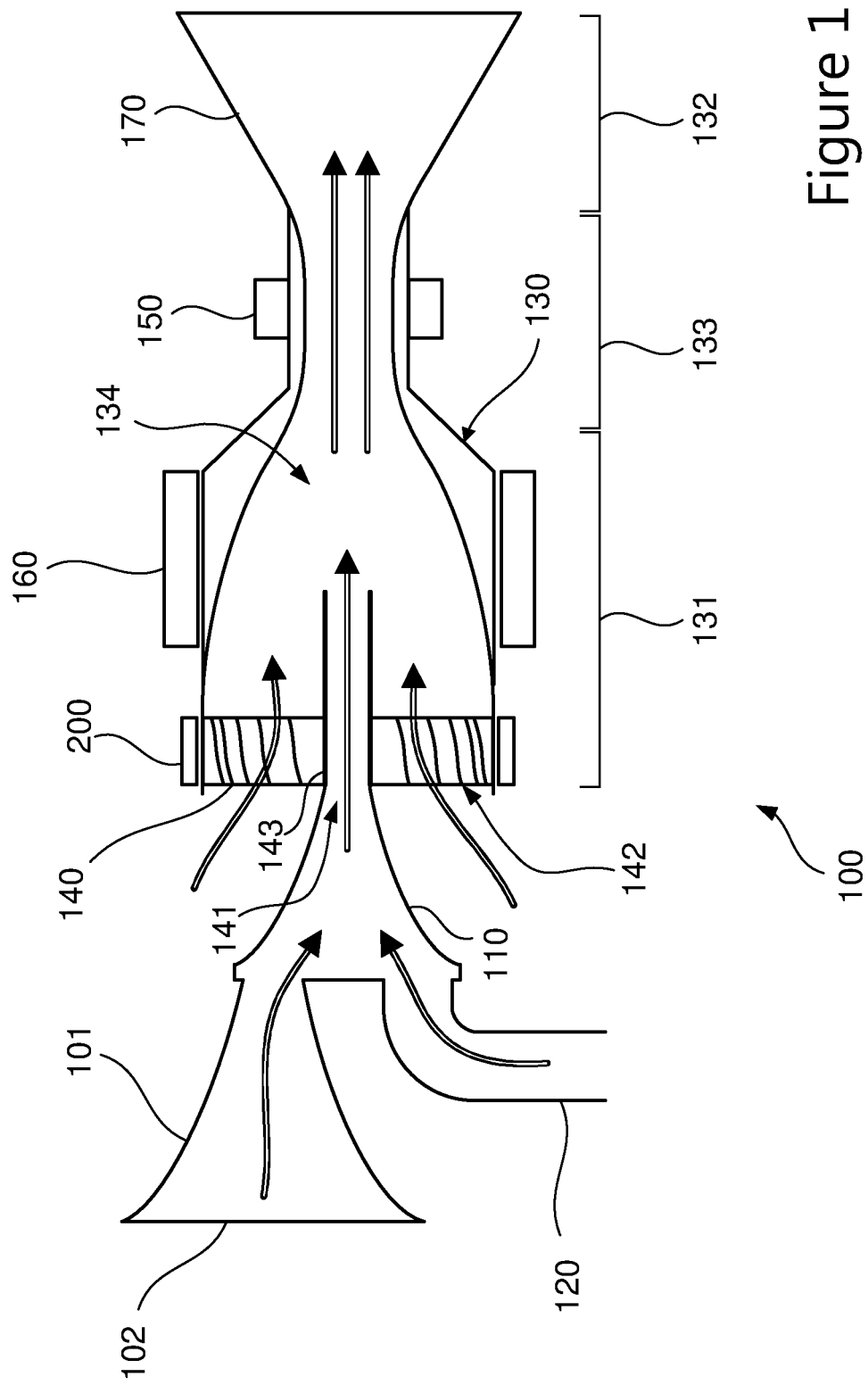
FIG. 1 shows a basic cross-section layout of a generator according to the present invention.

The arrangement shown in FIG. 1 is a simplified cross section through an air powered generator 100. The generator is mounted so that a ram 101 is facing towards the upstream direction of the wind impinging on the generator 100. The generator is preferably mounted on a base (not shown) which allows it to be redirected into the wind should the wind direction change. This may be an active system or a passive system such as by use of a fin or vane mounted on the generator to cause the generator to rotate on its base when it is not aligned with the wind.

As the wind impinges on the mouth 102 of the ram 101, it is forced into the ram. The ram has a tapered profile to accelerate the air as it passes along the ram. The air passes in the direction of the arrow into a second ram 110. A secondary feed tube 120 is used to channel air from a secondary source. The secondary source could be any source of air flow such as the exhaust from a boiler or other combustion source, the exhaust from a tumble dryer, a kitchen or bathroom extractor etc. Such a source can provide a substantial flow of air which carries a significant amount of energy. The air flowing from the exhaust travels along the tube 120 and into the second ram 110. The air mixes with the air entering from the ram 101.

In this embodiment, the second ram 110 is also tapered along its length so that the combined air flow from the first ram 101 and the tube 120 is forced to accelerate as it passes down the ram. However, in other arrangements the ram may not taper along its entire length.

The airflow exits the end of the second ram 110 into a rotor section 130. The first ram 101, second ram 110 and feed tube are mounted in the stationary (apart from rotating the body of the generator so that it is angled towards the wind) part of the generator. The generator may have a shell or structure (not shown) to support the stationary parts.

Although the use of moving air from both wind and exhaust sources helps to maximize the energy collection capability of the generator, either source may be used on its own, if for example, one source is not available such as when there is no wind or the secondary source is not active. Furthermore, the generator may be designed to only utilize a single source and so the first 101 or second 110 rams may be dispensed with.

The rotor 130 includes an intake section 131 at the front of the rotor 130 where the air from the second ram 110 enters the rotor 130. The rotor also includes a turbine section 132 at the rear of the rotor 130, where the accelerated air is used to drive the rotor into rotation. The rotor is mounted on bearings 150 to allow the rotor to rotate freely. Armatures 160 are provided surrounding a portion of the rotor, for generating the electrical power from the rotation of the rotor. The bearings and armature will be mounted on the stationary part of the generator. In this embodiment, the rotor has annular walls defining the space within the rotor which rotate with the rotor. However, the rotor may be provided within a container with a similar shape but which is stationary.

The positioning of the armatures 160 and the bearings 150 may be changed according to variations in the design and the positioning in the embodiment is simply exemplary of a typical arrangement.

The front of the intake region 131 of the rotor 130 is provided with a compressor 140. The compressor includes two axial concentric passageways 141,142 through which air may flow. The passageways are separated by an annular wall 143 between them to separate the flowing air in the outer passageway 142 from that in the inner passageway 141 and vice versa. The inner passageway 141 may optionally include blades (not shown) which help to accelerate the air passing through them, although this is not essential. These blades would form a small axial compressor stage, using the revolution of the rotor to draw in and compress the air at the intake. This will provide an additional pressure component giving high initial gain in exit velocity from the inner tube 143. However, these blades are not essential and may only be included in some embodiments, typically dependent on the application and available energy source and type.

The airflow from the second ram 110 is directed into the inner passageway 141. The end of the stationary ram is arranged so that the air flow from it is directed into the inner passageway 141 although the ram 110 is not connected directly to the rotor as the ram does not rotate. Instead, the exit of the ram is arranged in close proximity to the end of the wall 143 to form a relatively continuous passage from the ram into the inner passageway. An airtight seal may be formed although it is generally adequate to allow a small gap between the two which avoids the need for potentially complex seal arrangements.

The air flowing out of the second ram 110 passes along the inner passageway 141 accelerated by the compressor blades. The wall 143 extends along a portion of the length of the intake portion extending the inner passageway into the inner chamber 134 of the rotor. As the air exits the inner passageway, the tapering sides of the inner chamber 134 of the rotor cause the air to accelerate. Known as the Venturi effect, this causes a lowering of the pressure within the rotor and helps to draw air in through the outer passageway 142.

The outer passageway 142 is provided with compressor blades 144 (see FIG. 2) which help to drive air from outside the rotor into the inner chamber 134 as the rotor turns. This drives air into the inner chamber 134 which joins the flow of air through the inner tube 143 and accelerates towards the central region 133 of the rotor. The air is now flowing at high speed and passes into the turbine section 132. As the air pass through the turbine section 132, it engages blades or surfaces (not shown) in the turbine 170 which drives the rotor to rotate. The air is then exhausted out of the rear of the turbine section 132.

With this arrangement, the energy from the wind impinging on the mouth of the generator is combined with the energy available from the airflow derived from the secondary source. This means that even on calm days, the energy from the secondary source can still be recovered and equally when there is wind but the secondary source is not available (e.g., where the boiler is not switched on a warm day or at night), the generator can still produce energy.

Under ideal conditions, with steady wind and a constant flow from the secondary source, the turbine could be optimized to extract energy from the flow most efficiently. However, the reality is that the wind is variable and the secondary source may vary or not be available at all. This means that the generator has to be able to generate energy across a range of potential input speeds. The wind variability is particularly problematic as it can be highly variable over a short time frame. It can go from virtually stationary to high speed gusts in a short space of time. As a result, particularly in the absence of flow from the secondary source, the rotor may go from stationary to a high speed and then back again repeatedly.

This makes it difficult to optimize the generator to any particular flow rate and so must be able to operate over a range of speeds, some of which may be less efficient than others. However, in order to optimize the energy extraction, it is desirable to run the rotor at a speed as close as possible to the optimal speed. It is therefore desirable to get the rotor to that speed as quickly as possible when it is running slowly, e.g., during a lull in the wind. The quicker the rotor can be brought up to the speed or range of speeds where it operates most efficiently, the better the overall efficiency of the generator can be.

Figure 3:
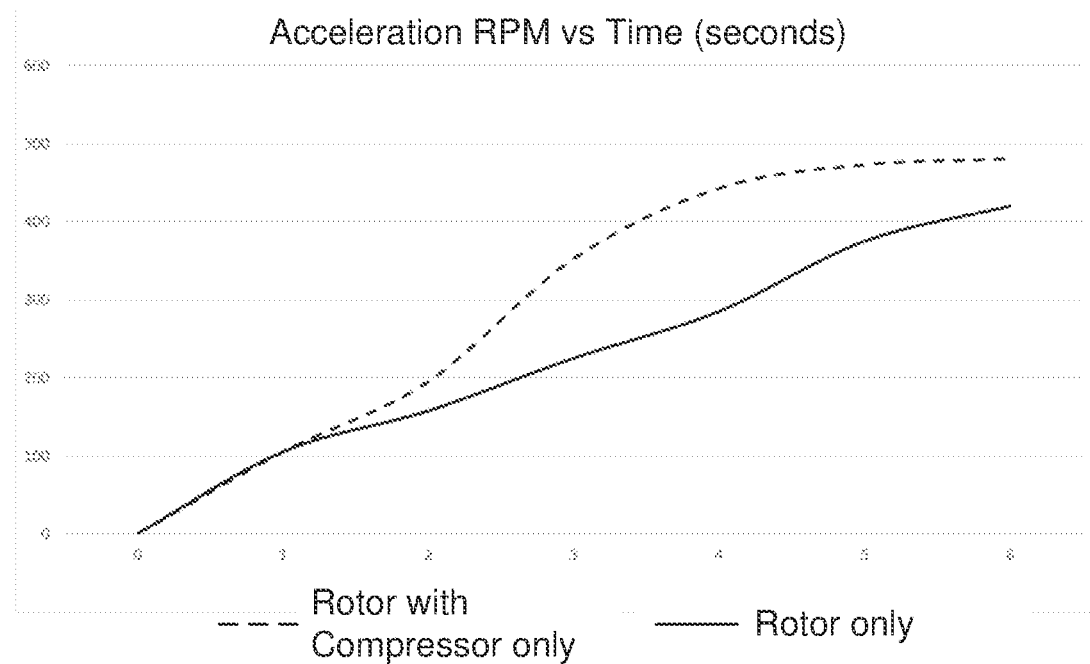
FIG. 3 shows the relative acceleration of a basic system and one with a compressor.
Figure 4:
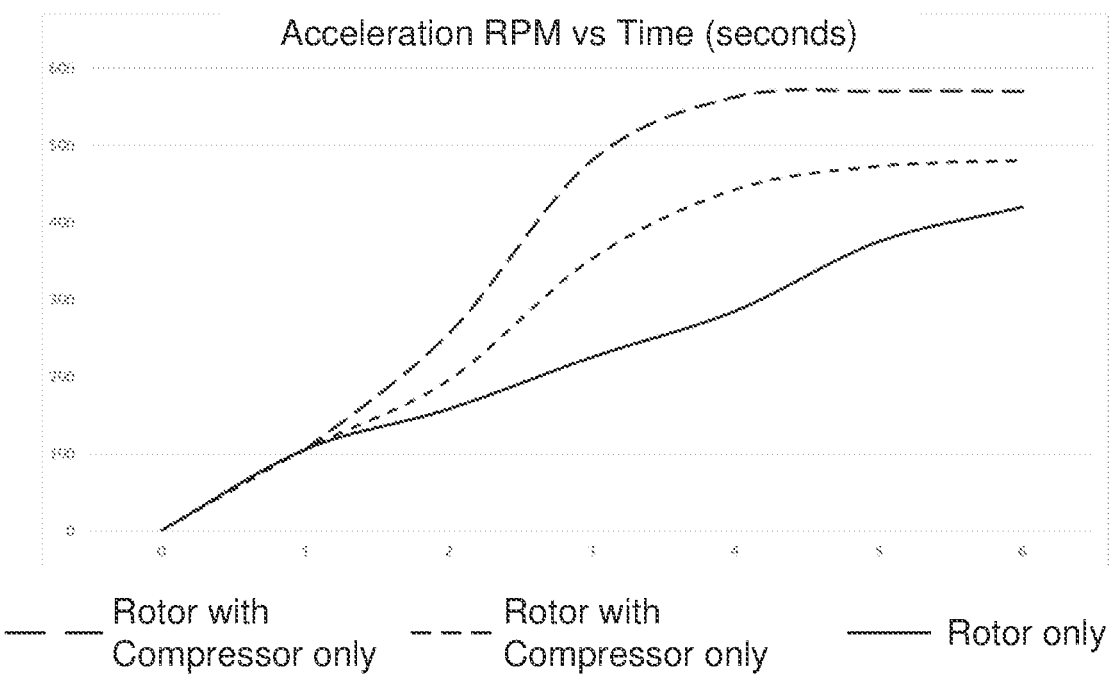
FIG. 4 shows the relative acceleration of a system with an electrostatic motor.

FIG. 3 shows the acceleration from stationary for the rotor when a fixed wind speed is applied to the generator. The solid line shows the acceleration, over a period of 6 seconds from when the wind is provided, of the rotor in the absence of the compressor 140. As can be seen, the rotor accelerates fairly steadily up to around 400 rpm. At this speed, the rotor speed will then tend to plateau as it reaches equilibrium.

The use of the compressor 140 helps to improve the acceleration of the rotor, as can be seen in the dotted line of FIG. 3. The rotor reaches a similar speed of around 400 rpm in around 3 to 4 seconds but also continues to accelerate to a speed of nearly 500 rpm before it tends to plateau. This shows the benefit of using the compressor section to enhance both the acceleration and total speed for a given wind input. If, in the example above, the turbine is configured to operate at high efficiency above 350 rpm, then this can be achieved much more quickly and the generator produce a high output sooner than with no compressor. Without the compressor that speed is only reached after about 4.5 seconds whereas with the compressor, the speed is reached after about 3 seconds and so the rotor spends a greater proportion of its time rotating at the higher, more efficient speed.

However, there is still a delay of around 3 seconds before the desired speed is reached, meaning that the generator may only be able to produce a fraction of the optimum power during that period. If the wind is cycling over a period of 12 seconds such that after 6 seconds the wind dies away again for a further 6 second period during which the rotor will begin to slow and will again fall below the optimum speed before becoming stationary, or just dropping to a low inefficient speed, before the next gust of wind accelerates the rotor again, as before. This means that the generator may only be generating efficiently for around half the time.

In order to increase the proportion of the time that the generator is operating at maximum or close to maximum efficiency, it is desirable to increase the acceleration of the rotor as it initially speeds up as the wind speed rises again and ideally reduce the deceleration when the wind drops again.

Figure 2:
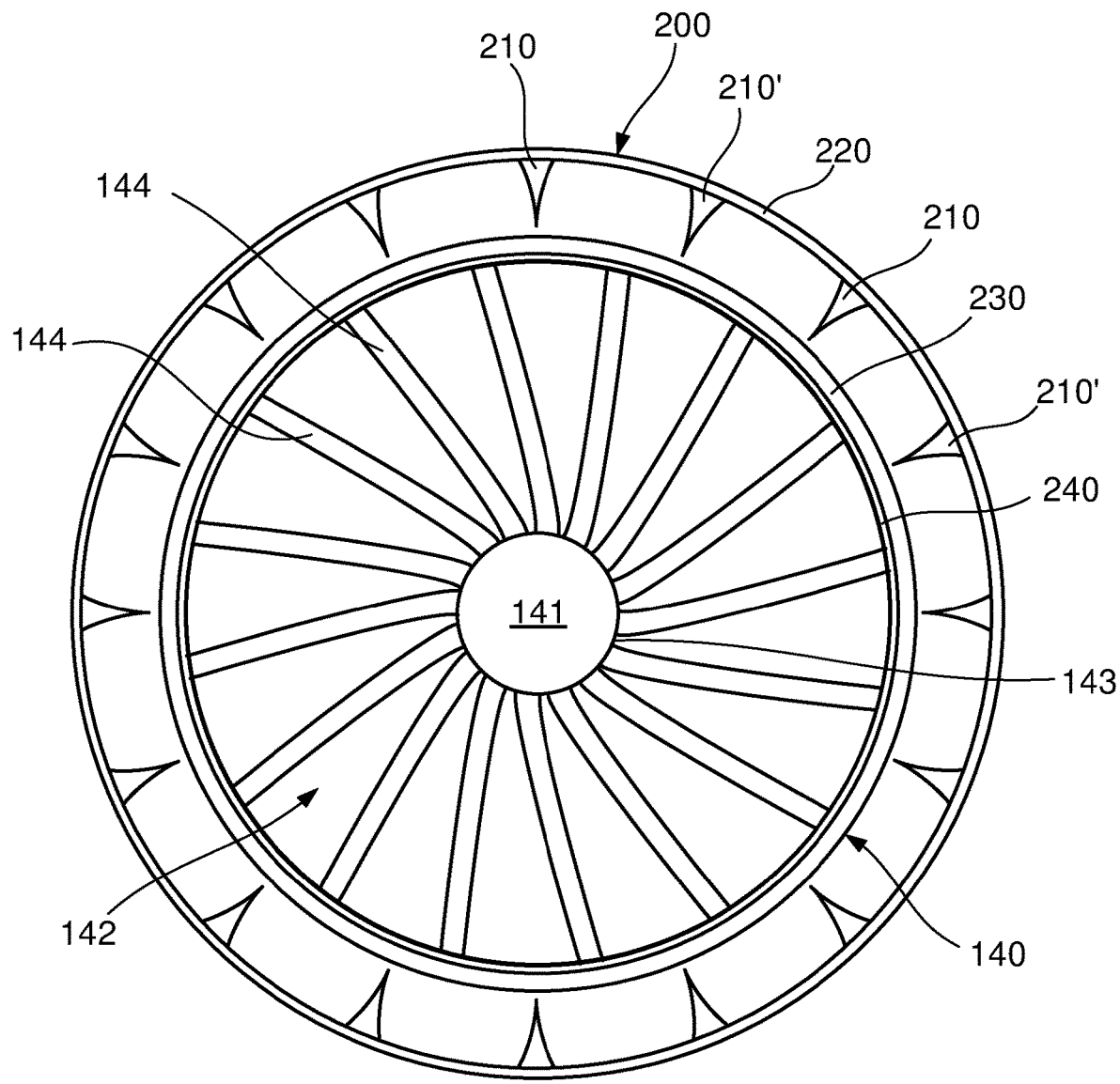
FIG. 2 shows an end view of a rotor inlet.

FIG. 2 shows an external end view of the compressor end of the rotor looking in the direction in which the air flow enters the rotor. The wall 143 separates the concentric axial inner passageway 141 and axial outer passageway 142 as described above. The blades 144 of the compressor are also shown. Radially outward of the blades is a circumferential conductive layer 240 forming an annular ring around the outer part of the rotor. Surrounding the conductive layer 240 is an insulating layer 230 also formed as an annular ring around the conductive layer and forming the outer surface of the rotor 140.

The conductive layer 240 and the insulating layer 230 also extend, parallel to the rotor axis into the rotor along the width of the compressor 140, to form a cylinder around at least part of the radially outermost parts of the compressor blades 144. Surrounding the insulating layer 230 is an electrode ring 200 which is not connected to the rotor but instead is mounted to the stationary part of the generator. The electrode ring includes a support structure 220 which has a generally circular shape and carries a series of electrodes 210, 210' arranged at spaced apart angles around the inner circumference of the ring.

Figure 5:
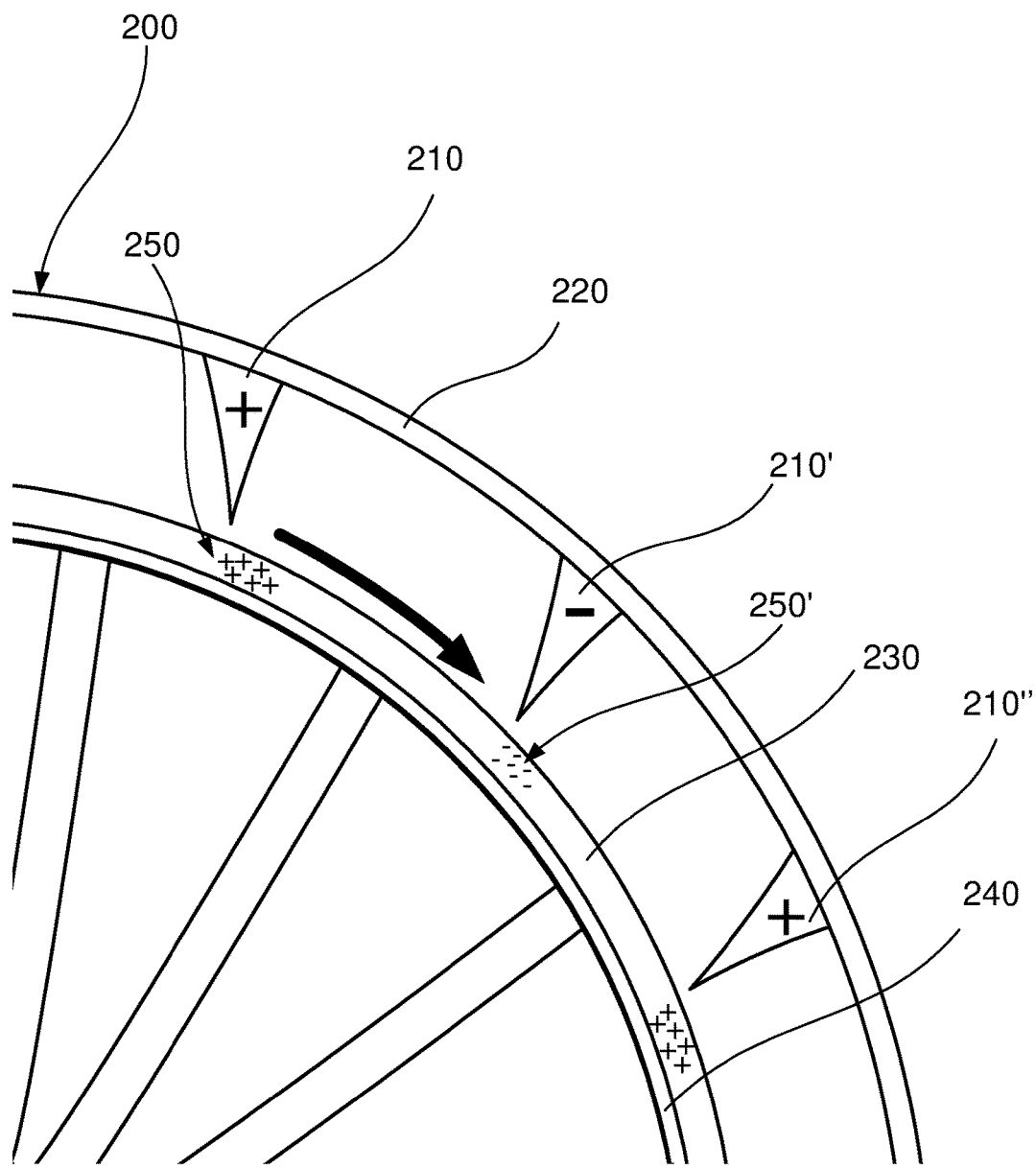
FIG. 5 shows an enlarged section of the rotor and electrode arrangement.

The electrodes are connected to a high voltage power source with alternate electrodes 210 connected to a positive voltage source and the intermediate electrodes 210' connected to a negative voltage source (or vice versa). These electrodes are arranged so that they are in close proximity to the insulating layer 230, as shown in FIGS. 2 and 5. The proximity of the charged electrodes causes the insulating material to charge in the proximity of the electrodes (the Triboelectric effect).

This effect works through the generation of an electric field around the electrodes causing a corona discharge. The charged air molecules pass over the face of the ring adjacent to an electrode 210, causing it to become charged with the same polarity as the electrode. Referring to FIG. 5, the electrode 210 is positively charged and the electrode 210' is negatively charged. The charges on the respective electrodes induce a similar charge in the insulating layer 230 in the region adjacent to the electrode tip. This charge on the insulating ring causes a repulsive force (due to the repulsion between similarly charged elements) away from the similarly charged electrodes 210, 210'. This repulsive force drives the rotor to rotate in the direction of the arrow shown. This tends to cause the rotor to accelerate.

As the rotor moves, the charged regions 250, 250' of the insulating ring move toward the next electrode which is oppositely charged. For example, the region 250' is charged by the negatively charged electrode 210' with a negative charge. Once charged, the negative charge on the ring is repelled by the negative charge on the electrode tending to drive the charged region away from the electrode. As the charged region moves away from the electrode 210' and towards the electrode 210" which is positively charged. The opposite charges tends to draw the charged region 250' towards the electrode 210" which again tends to accelerate the rotor.

As the charged region 250' approaches, the electrode 210", the charge is reversed due to the positively charged electrode removing the negative charge and inducing a positive charge. As the rotor continues to rotate, the region 250' is now positively charged and will be repelled by the positively charged electrode 210". This process will be repeated around the insulating layer and around the circumference of the rotor. Each electrode will charge and deflect the insulating layer to accelerate the entire rotor.

Although FIG. 5 shows discrete regions as being charged, this is for explanatory purposes only and in reality, the insulating layer 230 will be charged to the polarity of the electrode as it passes under and will remain charged until it reaches the next electrode when the charge will be reversed, so that the insulating layer will be charged to one polarity or the other around most of its periphery with transitions under each electrode.

Figure 2A:
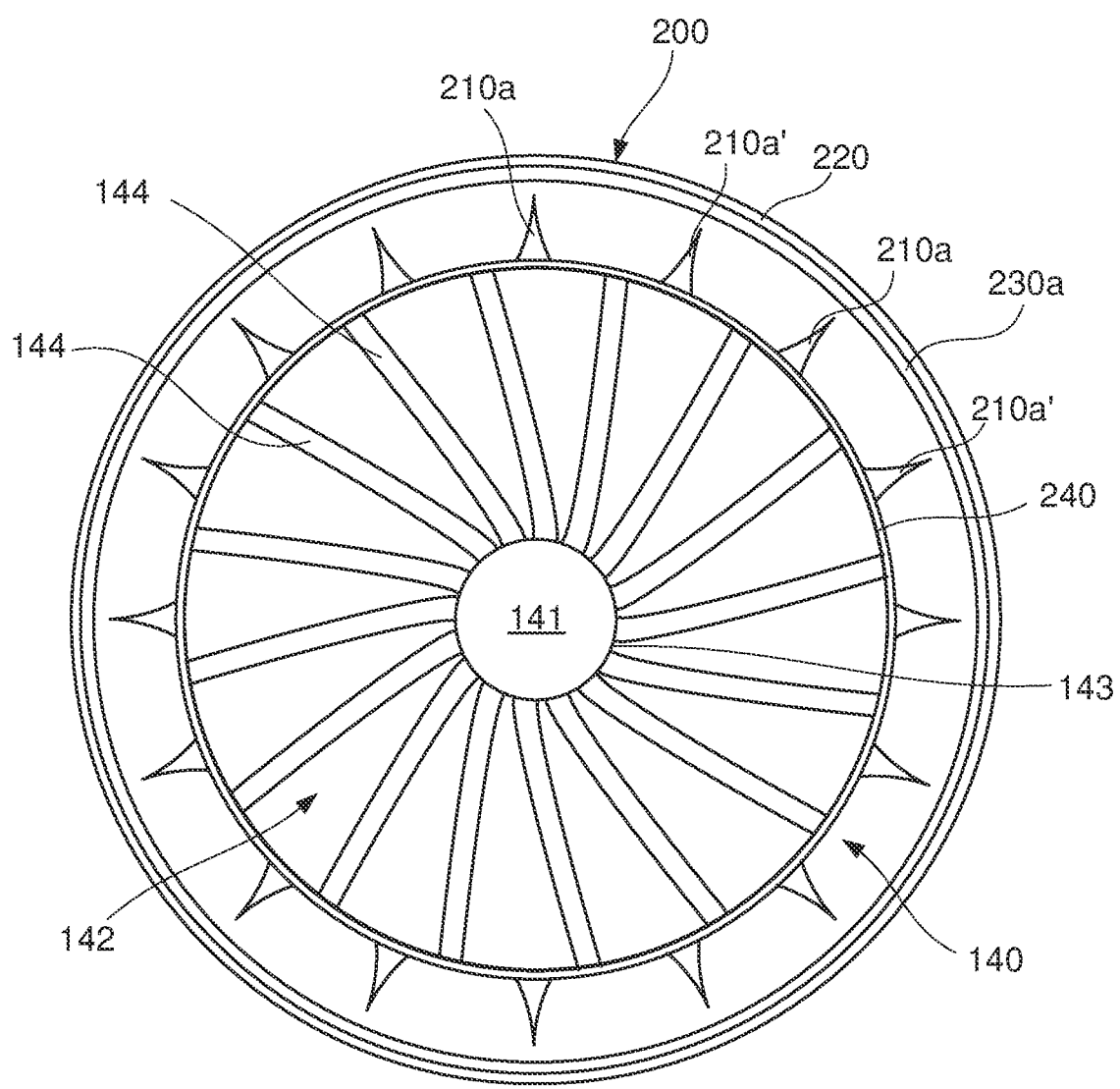
FIG. 2A shows an end view of a rotor according to an alternate embodiment.

In the arrangement above, the electrodes 210, 210' are arranged on the support 220 with the insulating layer provided on the rotor. This is convenient as the connections to the electrodes 210, 210' can be made to the stationary part of the generator. The conductive layer 240 can be grounded by a single connection to the rotor which is easier to implement. However, the static motor may be reversed with the electrodes provided on the rotor part and the insulating layer and conductive layer provided on the stator. In this respect, FIG. 2A depicts an alternate embodiment with the rotor inlet similar to the rotor inlet of FIG. 2, however, with electrodes 210a, 210a' attached to the conductive layer 240 and an insulating layer 230a attached to the interior of the support structure 220. The electrodes may be provided on the end of the blades 1244, which may be conducted to have conductive ends.

FIGS. 2 and 5 show an embodiment where the electrode ring is provided on the circumferentially outer edge surface of the rotor. However, the electrostatic motor effect may be achieved with other configurations such as where the charged electrodes are arranged in proximity to the side face of the rotor rather than around the circumferentially outer edge.

Figure 6:
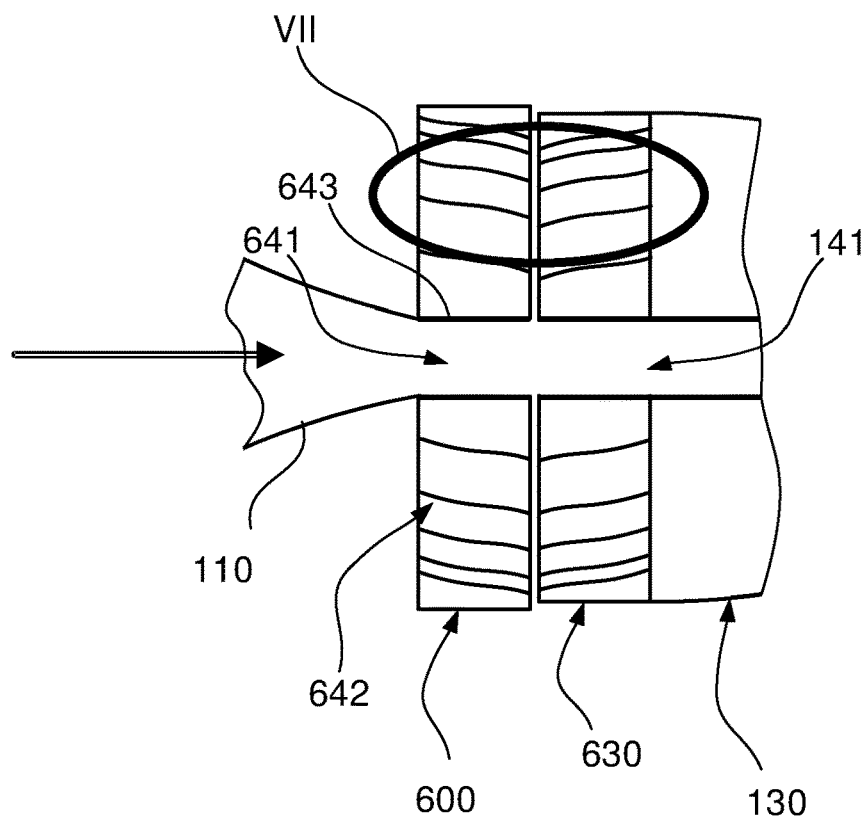
FIG. 6 shows a partial section of a generator with an alternative arrangement of the electrostatic motor.

FIG. 6 shows a partial view of a modified generator arrangement with an additional stator 600 provided upstream of the rotor 130. The stator is similar to the rotor in that it is provided with a series of generally radial blades similar to those shown in FIG. 2. However, the shape of the blades may be different. The stator does not rotate and so the blades remain stationary but act to direct the air flow to optimize the flow of the air striking the blades of the rotor. Similarly to the rotor, the stator is provided with an inner central passageway 641 and an outer passageway 642 arranged coaxially around it. The inner passageway 641 helps to channel the air from the second ram 110 into the inner passageway 141 and through to the central region 133. Again, central passageway 641 and the inner passageway 141 may optionally be provided with blades.

The rest of the generator, which is not shown in FIG. 6, is otherwise similar to that shown in FIG. 1.

Figure 7:
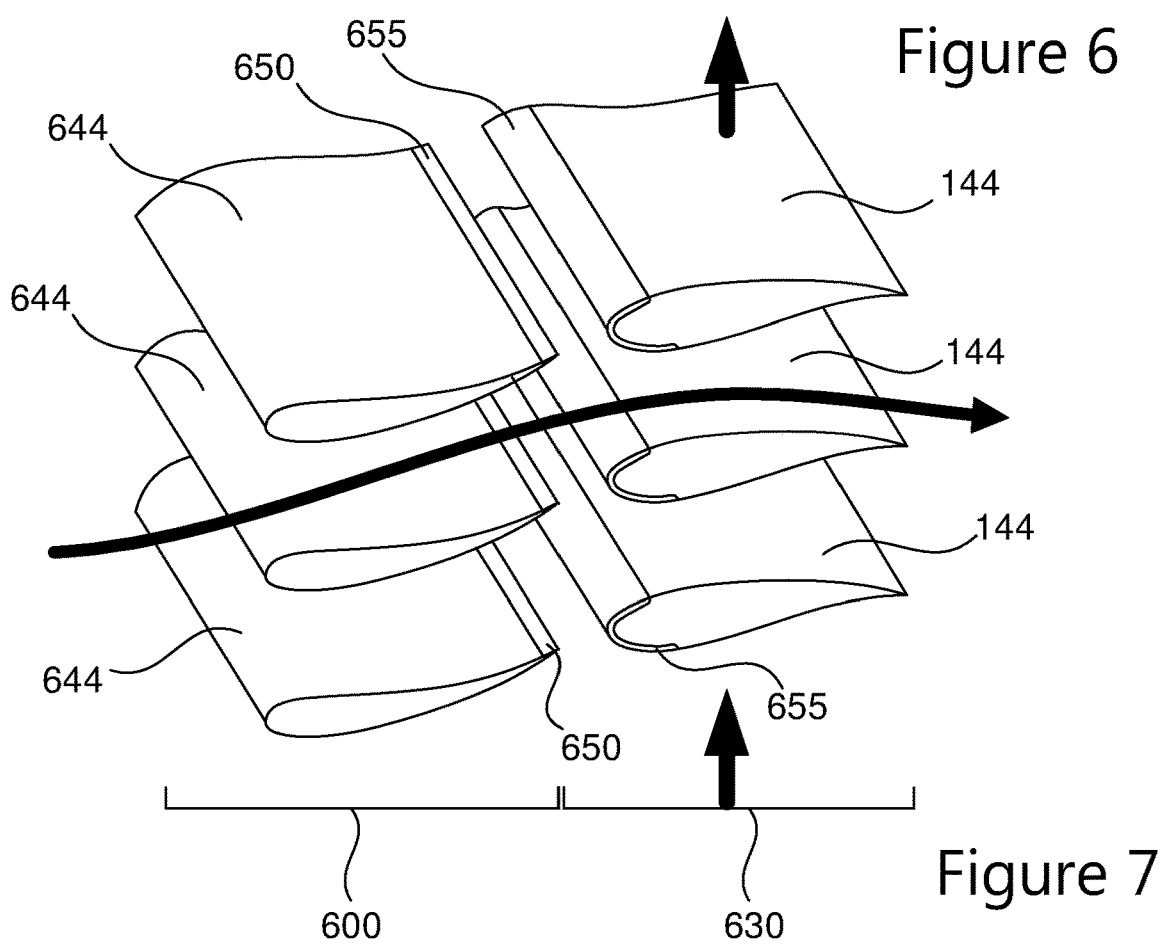
FIG. 7 shows a partial close up perspective view of the arrangement of the rotor and stator blades.

FIG. 7 shows a partial close up view of the respective blades of the stator 600 and the compressor section 630 of the rotor 130 in the region lying within the circle labelled VII shown in FIG. 6. The general direction of airflow through the stator and rotor is shown by the large arrow in the diagram. The trailing edges of the stator blades 644 are arranged at the downwind end of the blade where the airflow leaves the blade having passed over its surface. The end face of the stator defined by the trailing edges of the blades of the stator is arranged adjacent to the corresponding face of the compressor section 630 of the rotor formed by the leading edges of the blades 144. In this arrangement, as the rotor rotates, the leading edges of the blades 144 of the compressor 630 pass in close proximity to the trailing edges of the stationary blades 644 of the stator.

Each of the stator blades 644 of the stator 600 is provided with a conductive section 650 on the trailing edge of each blade 644. The section may be formed by a conductive strip provided near the trailing edge of the blade or a conductive coating applied to the surface. The conductive section may extend along the entire radial length of the blade or along a portion of the length. Whilst the conductive section 650 is shown as provided at the trailing edge of the blade, more or all of the entire blade may be conductive.

The rotor blades 144 are provided with an insulating section 655 at the leading edge of the blades 144 in the compressor 630. The insulating section 655 is formed as an insulating layer around a conductive part of the blade 144. The insulating material used for the conducting section is preferably one which is high on the Triboelectric series to maximize the charging effect. For example, polyethylene or polypropylene are relatively high on the Triboelectric series whilst also providing suitable material for use in the rotor blade. The conductive section may be formed by the entirety of the rest of the blade 144 being formed of a conductive material, as shown in FIG. 7. Alternatively, where the rest of the blade is not made of a conductive material, a conductive layer can be provided between the insulating section 655 and the rest of the blade. With this arrangement, the leading edge of the tip has a layer of insulating material that may be charged whilst having a conductive layer lying between the inner surface of the insulating layer 655 and the rest of the blade.

Figure 8:
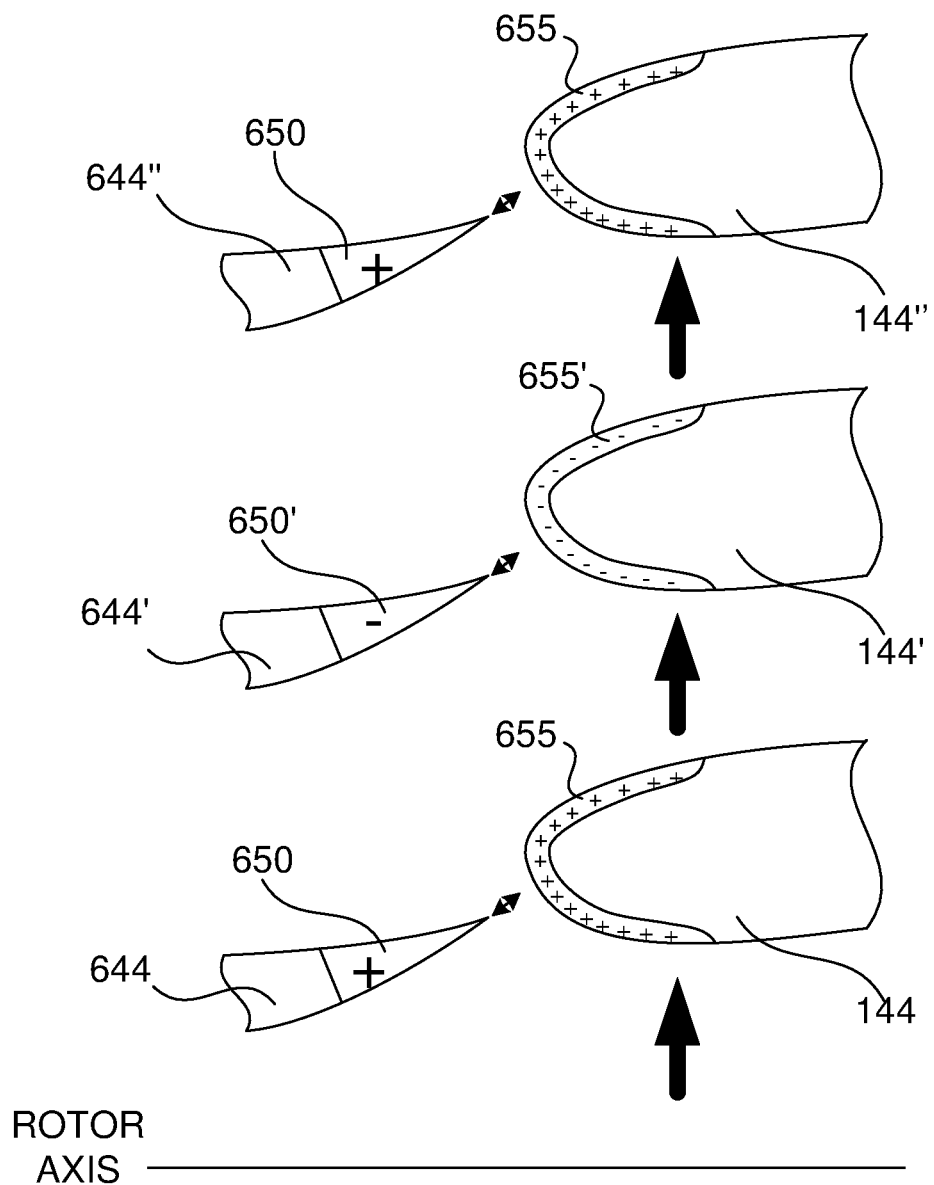
FIG. 8 shows a partial close up view of the arrangement of the tips of the rotor and stator blades.

FIG. 8 shows a more detailed view of the tip sections of the blades shown in FIG. 7. In use, the conductive sections 650, 650' on the stator blades 644, 644', 644" are charged. Alternate blades are charged positively and negatively, as shown in FIG. 8. The conductive sections 650 of alternate blades are charged with a positive charge. As the rotor rotates, the leading edge of a rotor blade 144 will approach the conductive section 650 on the stator blade 644. The direction of rotation of the rotor is shown by the big arrows in FIG. 8. As the blade 144 approaches the conductive section 650, the positive charge on the conductive section induces a similar positive charge on the insulator material of the insulating section 655.

A similar effect occurs where each of the stator trailing edges is approached by a blade on the rotor. In the example of FIG. 8, the stator and rotor have a similar number of angularly spaced blades such that all the blades on the stator line up with a respective blades on the rotor. However, the stator and rotor may have different numbers of blades and may not be angularly aligned.

The negatively charged conductive sections 650' on the blades induce a negative charge on the insulating portion 655' on the respective rotor blade. The negative charge on the conducting section 650' repels the negative charge on the insulating section 655' on the blade 144'. Similarly, the positive charge on the conducting section 650 repels the positive charge on the insulating section 655 on the adjacent blade 144, 144'. The repulsive force is shown by the small double ended arrows in FIG. 8. This will tend to accelerate the rotation of the rotor, shown by the larger arrows.

As the rotor continues to rotate, the rotor blades will move away from the respective stator blade which charged it and towards the next stator blade. As this happens, the opposite charge on the next stator blade will tend to attract the rotor blade. As blade 144 moves towards blade 644', the respective opposite charges will tend to pull the blade towards each other. This will again accelerate the rotation of the rotor.

Once the leading edge of the rotor blade 144 gets close to the trailing edge 650' of the stator blade 644', the negatively charged conductive section 650' will tend to induce a negative charge in the insulating section 655. As the rotor continues to rotate, the blade 144 will pass by the blade 644' and the now negatively charged insulating section 655 will be repelled by the negatively charged conductive section 650'. A similar process will take place on the other blades. For example, blade 144' which is initially negatively charged will be repelled by the blade 644'. It will then be drawn towards the next blade 644" which is positively charged. As it passes by that blade, the negative charge will be replaced by a positive charge due to the effect of the positively charged conducting section 650 on the end of the blade 644". This will then tend to push the now positively charged insulating section 655' away from the stator blade.

This process of charging, repelling, attraction to the next blade and switching the charging repeats as the rotor blades travel around the axis of the rotor and passes each stator blade.

The combination of these effects produces an overall acceleration on the rotor to assist in accelerating it. This increased acceleration helps to get the rotor to an efficient rotation speed more quickly.

In addition to the effect of the electrostatic motor described above, the charged conducting sections 650, 650' etc. act as electrodes. The high voltage on these electrodes causes a corona discharge, charging and ionizing the air molecules that pass by the conducting section and in particularly the pointed end at the tip of the blade where the field strength is maximize. The ionized a air is then repelled due to the now charged air molecules having the same charge as the electrically conducting portion it has passed. The repulsion of ionized air causes a drop in pressure, drawing further air in causing "ionic wind". This tends to accelerate the air away from the conducting portion towards the rotor (the Electrohydrodynamic effect). This tends to cause an overall acceleration of the air flow passing the stator blades 644, 644', 644", increasing the speed of the airflow towards the rotor. This further increases the speed of the airflow through the generator increasing the energy collected by the turbine and improving the energy recovered by the generator. This further assists in accelerating the rotor up to the optimum speed more rapidly during each cycle of the wind.

In the above arrangements, the electrodes are connected to a positive and or a negative voltage supply. One of the voltage supplies may be grounded. The voltages may be generated by any suitable high voltage generator. This may be powered directly from the electrical output of the generator or from a secondary source such as a solar power collector or other source of power. Where a heat source is available such as hot air from a combustion source, heat flow devices such as Peltier tiles may be installed to extract direct electrical energy from the source. These may be provided around a flue from a boiler or furnace where the high temperature of the flue and the relatively low temperature outside the flue provides a good temperature differential to extract electrical power.

As the electrostatic motor relies primarily on the high voltage used, and does not require significant currents, other sources of high voltage can be used. For example, high voltage may be generated using a static generator such as a Kelvin water dropper, where a source of water is available, or a Van de Graff generator using the rotation of the rotor.

The positive and negative voltages applied to the electrodes 650, 650' are preferably arranged to be positive or negative relative to the electrical layer under the insulator 655. The electrical layer under the insulator is preferably grounded. The positive and negative voltages applied to the electrodes are then preferably arranged to be positive or negative relative to ground.

To maximize the effectiveness of the electrostatic generator, the tips of the electrodes are preferably tapered to a relatively sharp point. The electrodes are preferably arranged to point at least partially in the desired direction of rotation of the insulating layer. For example, the electrodes 210, 210' in FIG. 5 are offset so that they do not point directly in the radial direction towards the center of the rotor but instead are offset in the direction of rotation of the rotor to point in a direction away from the center of the rotor. Similarly, the tips of the electrodes 650, 650' in FIG. 8 do not point along the axis of the rotor directly towards the compressor but are instead turned in a direction (upward in the figure) to reflect the direction of rotation.

In the example above, the stator includes fan blades which provide the support for the electrodes. The use of a stator with blades allows the airflow into the compressor to be directed to maximize the efficiency. However, the stator blades may be omitted and the electrodes may be simply mounted onto thin ribs arranged at angles around the center of the stator. This allows the airflow to enter the compressor, with minimal interference by the electrodes, whilst providing the required electrodes.

In the previous example, the stator ring 600 is provided at the upstream inlet end of the generator with the compressor section 630 ring of blades provided inside or downstream of it. The stator acts to direct the airflow passing into the generator so that it impinges on the compressor blades at an angle that maximizes the efficiency of the compressor. However other configurations of rotor and stator are envisaged, including having multiple sets of blades of stators and/or compressors. These are typically interleaved with each other, to allow the airflow to be redirected between respective sets of compressor blades.

Figure 9:
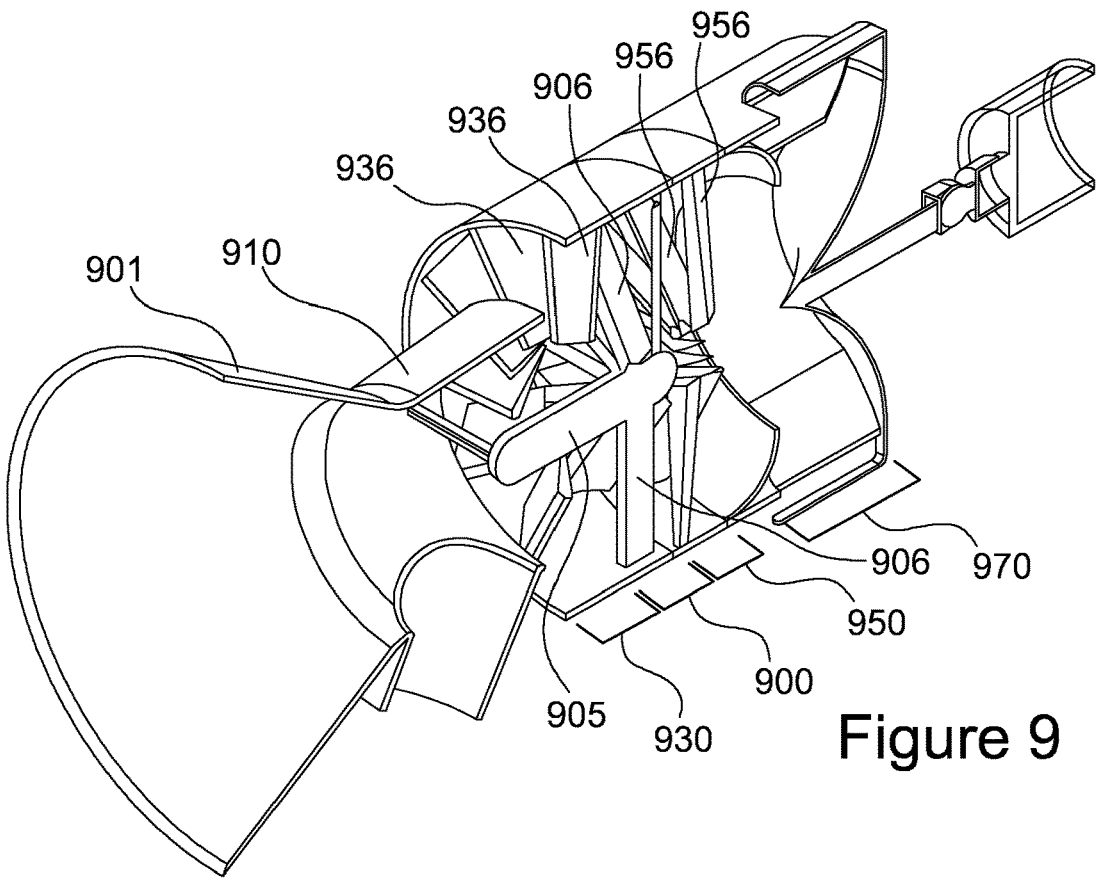
FIG. 9 shows a partial perspective view of further arrangement with a first stage compressor.
Figure 10:
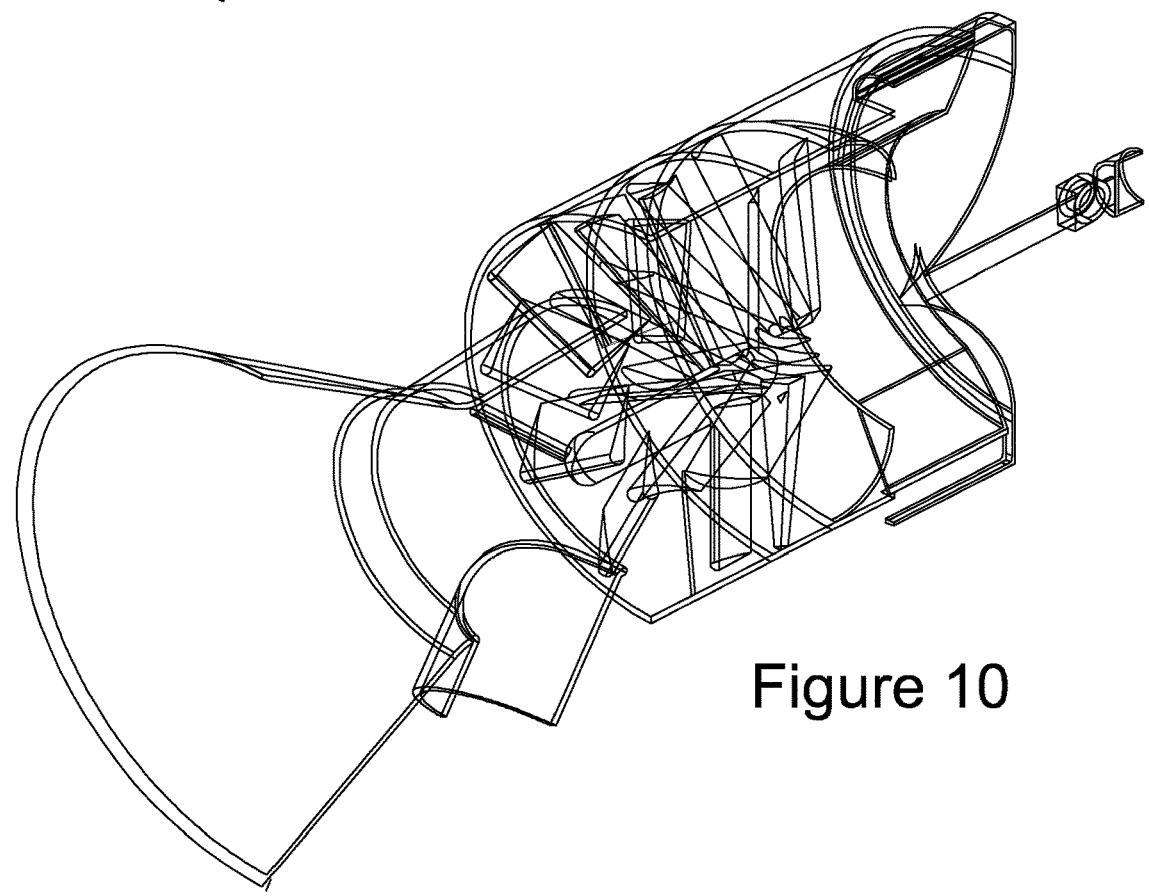
FIG. 10 shows a transparent version of the perspective view of the arrangement with a first stage compressor.
Figure 11:
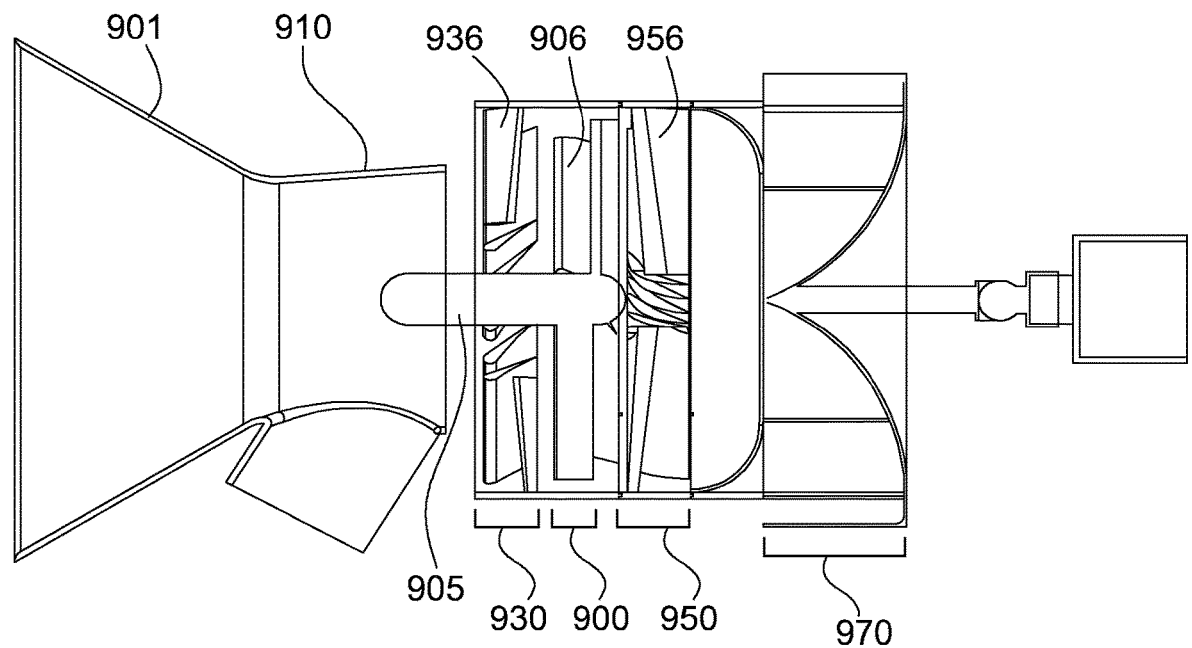
FIG. 11 shows a partial side view of the arrangement with a first stage compressor.
Figure 12:
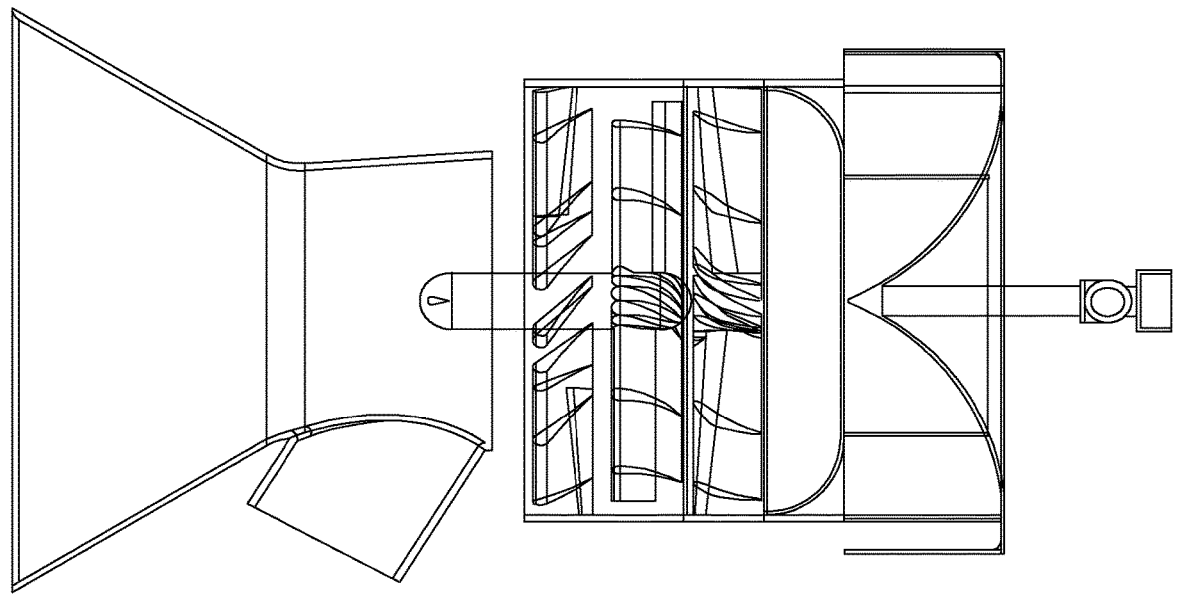
FIG. 12 shows a transparent version of the partial side view of the arrangement with a first stage compressor.

FIG. 9 shows a partial cut away perspective view of a further alternative arrangement. FIG. 10 shows a similar view but with the various parts displayed as transparent. FIG. 11 shows a partial cross-sectional view of the same device and FIG. 12 again shows a transparent version of this view.

In this arrangement, a compressor section 930 is provided at the upstream end of the generator. This section is connected to the rest of the rotor body. The next section, downstream of the compressor section 930, is a stator section 900. As can be seen from FIG. 9, this is supported by a central shaft 905 extending into the inner part of the generator. The shaft is then connected to the stationary part of the generator. As shown in FIG. 9, the shaft 905 is supported by arms extending into the air path from the stationary sides of the ram 910.

This central support shaft 905 results in a slightly different configuration for the air flow path. Rather than the central passageways described above, the airflow passes around the central shaft 905. The rams are also configured differently in this arrangement. Instead of the rams 901 and 910 having a convergent cross-sectional area like rams 101 and 110, the rams are configured differently. The ram 901 is convergent in a similar manner to the ram 101 but ram 910 has a divergent cross-sectional area along its length, increasing in cross section towards the outlet into the compressor section 930. With this arrangement, the air is accelerated along the first ram 901. As the air enters the diverging ram 910, air from the secondary source is also passed in from the side pipe to mix with the air from the ram 901.

The diverging ram 910 helps to accommodate the drawing and mixing of the two air flows. The diverging ram also slows and cools the air prior to entering the generator. This can be advantageous if the air is already at a high temperature, such as the air from a boiler flue. It also disperses the energy from the higher speed inlet air into a lower speed flow with greater mass flow.

In the arrangement shown in FIG. 9, the compressor section is formed of a series of blades 936 extending from an outer circumferential ring towards the central axis of the compressor section. The outer ring forms part of the rotor such that the entire ring and blades rotate with the rotor. In this embodiment, the blades 936 do not extend all the way to the center and stop short of the stator shaft 905, defining a space similar to the central passageways described above where the airflow can pass into the generator without passing through the bladed section of the compressor. However, the blades may continue up to the stator shaft 905 in alternative constructions depending on the desired parameters and configuration of the generator.

The ram 910 increases in cross-sectional area as it extends towards the compressor but the end of the ram is still smaller than the inlet area of the compressor allowing air to enter the compressor which bypasses the ram and is drawn from outside the generator. The compressor blades then act to drive that air into the generator.

As the air leaves the compressor section 930, it passes into the stator section 900. The stator section is formed of a series of blades 906 extending radially outwardly from the central shaft 905. These stator blades act to redirect the air passing through the compressor, either via the bladed section or through the unbladed central region. The stator modifies the direction of flow of the air prior to feeding it through to the third section 950.

The third section 950 again includes a number of blades 956 extending from an outer circumferential ring forming part of the rotor. This section acts as a turbine using the movement of the air to apply pressure to the blades causing them to be driven and accelerating the rotor. Again, in this embodiment the blades do not extend to the center although they may in some embodiments. The center may also be filled to restrict air flow through the center. In this embodiment, the third section is a turbine section for extracting power from the airflow. However, the blades may be configured differently so that they instead act as a further compressor stage to accelerate the air further into the body of the generator.

At the end of the three stages in the generator of FIGS. 9 to 12, there is a final turbine stage 970 for extracting the kinetic energy from the air to accelerate the rotor.

As noted above, other constructions with more stator and rotor sections can be used. For example, the stator shaft may extend through the center of the third section 950 to provide a further series of stator blades and that may be followed by further compressor or turbine stages.

Figure 13:
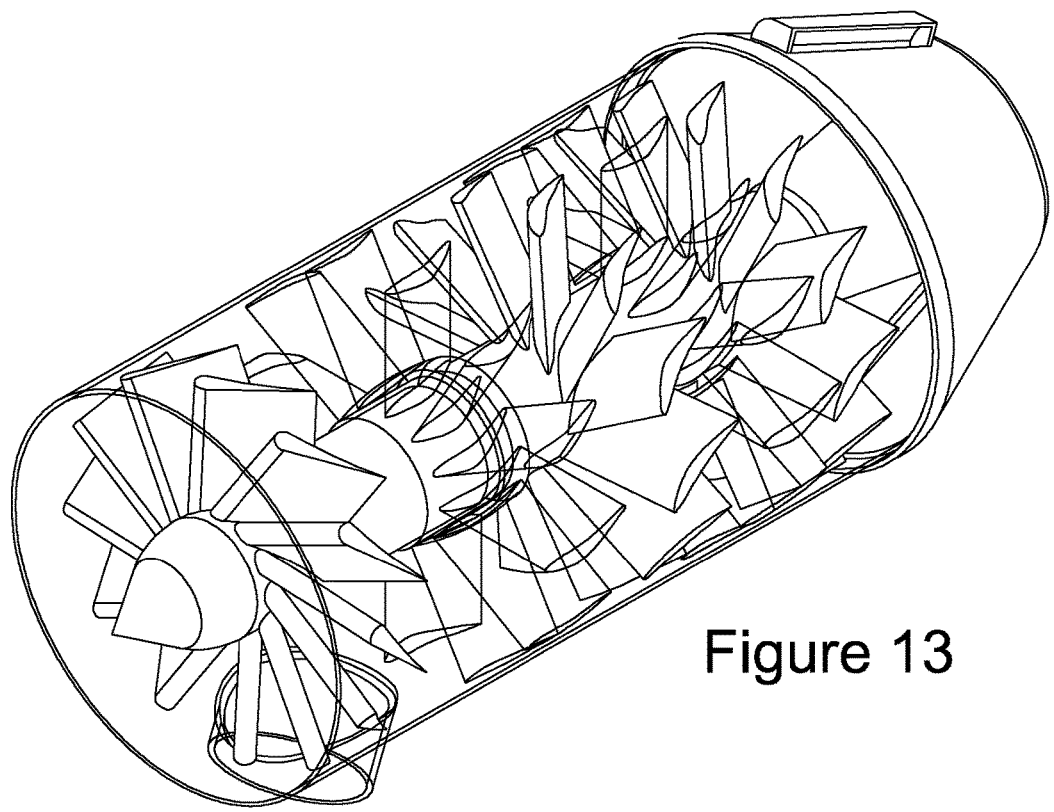
FIG. 13 shows a partial perspective view of a multi-stage generator.
Figure 14:
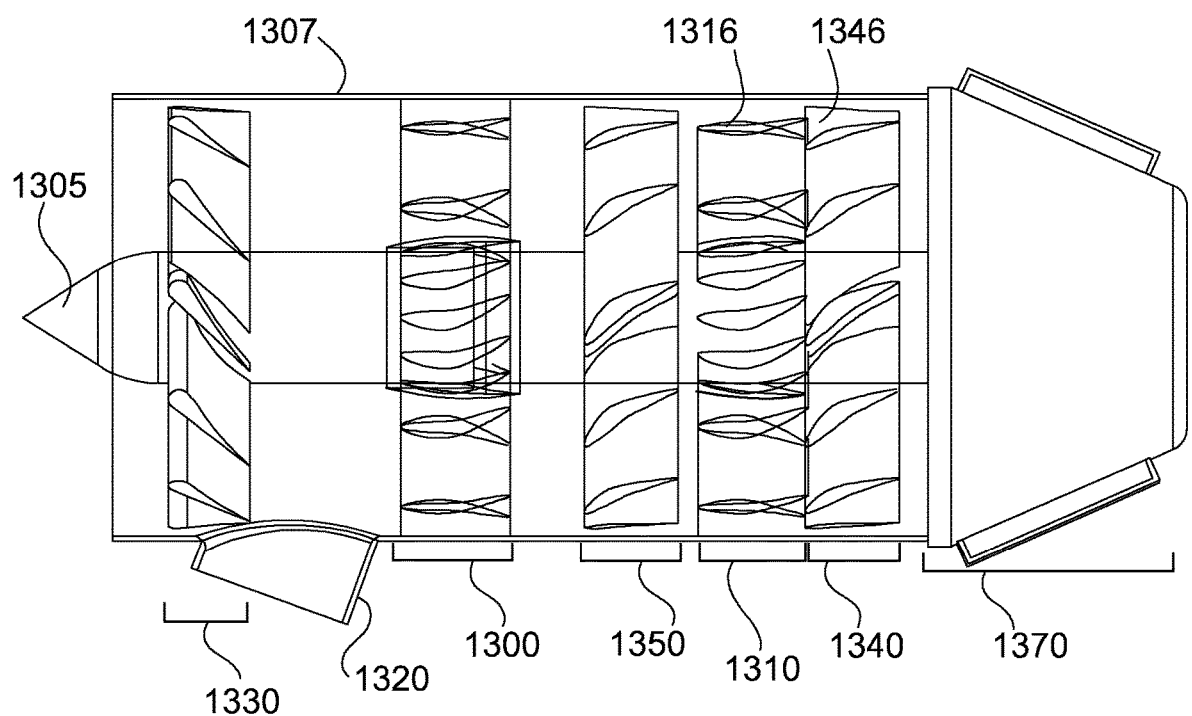
FIG. 14 shows a partial side view of a multi-stage generator.

FIG. 13 shows a partial perspective view of an exemplary generator with multiple stages. FIG. 14 shows a partial side view of the same device. Whilst the general principles are similar, the layout of this generator is somewhat different, demonstrating a further variation in the potential layout of a generator according to the invention. This arrangement has five sets of blades (1330, 1300, 1350, 1305, 1355). Also, rather than the rotor (rotating part) being the outer part of the air passageway, the rotor 1305 in this arrangement extends through the center of the generator. The first set of blades 1330 is mounted on the rotor and acts as a compressor, similar to the set of blades 930 above. However, this set of blades is set in front of the secondary air intake 1320. The incoming air from the compressor 1330 is mixed with the air from the secondary source. The combined air flow then passes through the set of static blades 1300 which form a stator mounted on the stationary outer shell 1307 of the generator. The blades may simply extend up to and short of the rotor body 1305, or may terminate in a bush mounted around the rotor and supported on the rotor via a suitable bearing.

The stator blades 1300 stabilize and redirect the air flow prior to passing into a second set of rotor blades 1350, which are again mounted on the rotor 1305 extending through the generator. The output of the second rotor 1350 is passed through a further stage comprising another set of stator blades 1310 followed by a set of rotor blades 1340. Further stages may be added according to the specific application and other conditions such as air flow source, speed, volume and so on.

With this arrangement, the electrostatic motor (not shown) is mounted on this final stage comprising the set of blades 1310, 1340. In a similar way to those shown in FIGS. 7 and 8, the rotor blades 1316 are provided with conductive strips at their trailing edges, similar to those shown in the blades 644 in FIG. 7. Again, the leading edges of the blades 1346 on the stator 1340 are provided with an insulating layer comparable to the layer 655, 655' shown in FIGS. 7 and 8. The stator blades may be structured in a similar with the rest of the blade being made of a conductive material or having a conductive layer provided beneath the insulating layer, as described above.

This arrangement forms an electrostatic motor which can be used to drive the rotor. The rotor 1300 and stator 1350 are shown spaced apart but in an alternative embodiment, they may be arranged in closer proximity, similar to the blades 1310 and 1340. Again, the sets of blades 1300, 1350 may be modified to provide conductive strips on the trailing edge of the rotor blades 1300 and insulating layers on the stator blades 1350, to form a second electrostatic motor. Further stages having a rotor and a stator can be modified to form further electrostatic motors, to enhance the overall driving force provided by the electrostatic motors.

The electrostatic motor described above can be incorporated in a similar manner into this construction. The blades of the stator section 900 are provided with conductive strips (not shown) on the trailing edges of the blades which will charge corresponding insulating strips (not shown) provided on the leading edges of the blades in the third section 950. This allows the electrostatic motor formed to provide additional driving force to the blades of the rotor in the third section 950.

In addition, a further electrostatic motor may be formed between the stator blades 906 and the blades of the compressor section 930. This can be done by using the stator blades to charge the compressor blades 936 of the stator section 930 by having conductive portions on the leading edge of the stator blades to charge insulating layers provided on the trailing edges of the compressor blades 936. This allows the high voltage sources to be connected to the stator blades which is easier than connecting them to the moving rotor blades. However, the rotor blades may be connected to a power source with conductive strips provided on the trailing edges of the compressor blades 936 to charge insulating sections provided on the leading edge of the stator blades 906. The repulsive force between the stator blades 906 and the compressor blades 936 will drive the compressor blades 936 away from stationary stator blades helping to accelerate the rotor.

Although the above embodiments are described in terms of collecting energy from a flow of air such as wind and a source of heated air such as from a boiler, the invention is also applicable to use with other fluids such as liquids or plasma. For example, the collector may be submerged in a flow of water such as a river or a piped flow of water from a water store such as a tank or reservoir etc. In terms of plasma, this is similar in some ways to an air flow device but where the fluid source might be from a high temperature combustion source or other plasma source.

The above described embodiments are exemplary and it is not intended that the invention defined by the claims be limited to these arrangements but rather other arrangements including modifications and combinations of the elements of these embodiments are anticipated.

The invention claimed is:

1. An energy collector for collecting energy from a flow of fluid, the collector having:
   one or more inlets for receiving said flow of fluid;
   a rotor mounted for rotation;
   a turbine mounted on said rotor for receiving fluid flow from at least one of said inlets, to drive said rotor into rotation; and
   an electrostatic motor arranged to accelerate the rotor.

2. An energy collector according to claim 1 further comprising one or more additional electrostatic motors, each arranged to accelerate the rotor.

3. An energy collector according to claim 1 wherein the electrostatic motor includes a part provided on a stationary part of the collector which is stationary, a rotor part provided on said rotor, a plurality of conductive electrodes provided on one of the rotor part and the stationary part and one or more insulator portions provided on the other of the rotor part and the stationary part, wherein the rotor part and the stationary part spaced apart from each other such that the electrodes are swept by the one or more insulator portions as the rotor rotates.

4. An energy collector according to claim 3 wherein said one or more insulator portions are each provided with a conductive layer on the opposite side of the insulator portion to that facing the electrodes.

5. An energy collector according to claim 3 wherein the rotor part is provided on an annular outer circumferential edge of the rotor and the stationary part is formed on an annular inner surface of the collector facing the annular outer circumferential edge of the rotor.

6. An energy collector according to claim 5 wherein the one or more insulator portions are provided on the rotor and the plurality of electrodes are provided on the stationary part of the electrostatic motor provided on the stationary part of the collector.

7. An energy collector according to claim 6 wherein the one or more insulator portions is a continuous annulus of insulator material.

8. An energy collector according to claim 3 wherein said plurality of electrodes include one or more positive electrodes and one or more negative electrodes, wherein the electrodes are arranged to be connected to a voltage source, in use, such that the voltage applied to the positive electrodes is positive relative to the voltage applied to the negative electrodes.

9. An energy collector according to claim 8 wherein each electrode tapers towards a tip portion of the electrode arranged nearest the insulator portions and each tip points at least partially in a direction offset from the radial direction.

10. An energy collector according to claim 8 wherein the rotor part is provided on an annular outer circumferential edge of the rotor and the stationary part is formed on an annular inner surface of the collector facing the annular outer circumferential edge of the compressor.

11. An energy collector according to claim 8 wherein:
the rotor has at least one end portion having a generally cylindrical outer profile with an axially facing rotor end face;
the rotor part is provided on at least the end portion of said rotor;
the stationary part has at least one end portion having a generally cylindrical outer profile with an axially facing end face opposing the end face on the rotor end portions;
and the stationary part is provided on at least the end portion of said stationary part.

12. An energy collector according to claim 3 wherein:
the rotor has at least one end portion having a generally cylindrical outer profile with an axially facing rotor end face;
the rotor part is provided on at least the end portion of said rotor;
the stationary part has at least one end portion having a generally cylindrical outer profile with an axially facing end face opposing the end face on the rotor end portions;
and the stationary part is provided on at least the end portion of said part.

13. An energy collector according to claim 12 wherein the electrodes are provided on the stationary part and the insulator portions are provided on the rotor part.

14. An energy collector according to claim 12 wherein the rotor part is provided on the turbine.

15. An energy collector according to claim 12 wherein the rotor part is provided on a compressor fan mounted on said rotor.

16. An energy collector according to claim 12, wherein the rotor part includes a plurality of radially extending angularly spaced elements, the edges of the elements defining said rotor end face.

17. An energy collector according to claim 16 wherein said plurality of angularly spaced elements are formed on the edges of respective fan blades.

18. An energy collector according to claim 12 wherein the stationary part includes a plurality of radially extending angularly spaced elements with spaces between the elements to permit air flow through said stationary part.

19. An energy collector according to claim 18 wherein said plurality of angularly spaced elements are formed on the edges of respective blades.

* * * * *